US011400651B2

(12) United States Patent
Chiron et al.

(10) Patent No.: US 11,400,651 B2
(45) Date of Patent: Aug. 2, 2022

(54) HEATING BUILD MATERIAL

(71) Applicant: HEWLETT-PACKARD DEVELOPMENT COMPANY, L.P., Houston, TX (US)

(72) Inventors: Adrien Chiron, Sant Cugat del Valles (ES); Esteve Comas, Sant Quirze del Valles (ES); Diego Javier Mostaccio, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 546 days.

(21) Appl. No.: 16/096,230

(22) PCT Filed: Jul. 22, 2016

(86) PCT No.: PCT/US2016/043522
§ 371 (c)(1),
(2) Date: Oct. 24, 2018

(87) PCT Pub. No.: WO2018/017117
PCT Pub. Date: Jan. 25, 2018

(65) Prior Publication Data
US 2019/0152146 A1 May 23, 2019

(51) Int. Cl.
*B29C 41/08* (2006.01)
*B29C 64/295* (2017.01)
(Continued)

(52) U.S. Cl.
CPC .......... *B29C 64/295* (2017.08); *B29C 64/141* (2017.08); *B29C 64/153* (2017.08);
(Continued)

(58) Field of Classification Search
CPC ... B29C 64/295; B29C 64/307; B29C 64/321; B29C 64/153; B29C 64/141; B29C 41/08; B33Y 10/00; B33Y 30/00; B33Y 40/00
See application file for complete search history.

(56) References Cited

U.S. PATENT DOCUMENTS 7,820,241 B2  10/2010  Perret et al.
9,254,535 B2   2/2016  Buller et al.
(Continued)

FOREIGN PATENT DOCUMENTS

CN   104837607 A   8/2015
EP       1700686    9/2006
(Continued)

OTHER PUBLICATIONS

"3D Printing Titanium and the Bin of Broken Dreams", spencer wright, Mar. 16, 2015, 12pgs http://pencerw.com/feed/2015/3/15/3d-printing-titanium-and-the-bin-of-broken-dreams.
(Continued)

*Primary Examiner* — Matthew J Daniels
*Assistant Examiner* — Shibin Liang
(74) *Attorney, Agent, or Firm* — HP Inc. Patent Department

(57) ABSTRACT

According to one example there is provided a method for three-dimensional printing. The method comprises forming a pile of build material on a heatable plate adjacent a spreader, heating the pile of build material by contact with the heatable plate, and spreading the heated pile of build material on a support platform.

8 Claims, 4 Drawing Sheets

(51) Int. Cl.
*B33Y 10/00* (2015.01)
*B33Y 30/00* (2015.01)
*B29C 64/141* (2017.01)
*B29C 64/321* (2017.01)
*B29C 64/153* (2017.01)
*B29C 64/307* (2017.01)
*B33Y 40/00* (2020.01)

(52) U.S. Cl.
CPC .......... *B29C 64/307* (2017.08); *B29C 64/321* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 2001/0045678 A1* | 11/2001 | Kubo | B29C 64/35 264/37.29 |
| 2005/0263933 A1 | 12/2005 | Welch et al. | |
| 2009/0206522 A1* | 8/2009 | Hein | B29C 64/153 264/497 |
| 2011/0223349 A1 | 9/2011 | Scott | |
| 2015/0224712 A1* | 8/2015 | Tjellesen | B29C 64/295 425/375 |
| 2016/0176118 A1 | 6/2016 | Reese et al. | |
| 2017/0014906 A1* | 1/2017 | Ng | B23K 26/703 |

FOREIGN PATENT DOCUMENTS

| | | |
|---|---|---|
| EP | 2897782 A1 | 7/2015 |
| RU | 2469860 | 12/2012 |
| WO | WO-2008061727 A1 | 5/2008 |
| WO | WO-2014044676 A1 | 3/2014 |
| WO | WO 2016050311 | 4/2016 |

OTHER PUBLICATIONS

International Search Report and Written Opinion for International Application No. PCT/US2016/043522 dated May 11, 2017, 7 pages.

* cited by examiner

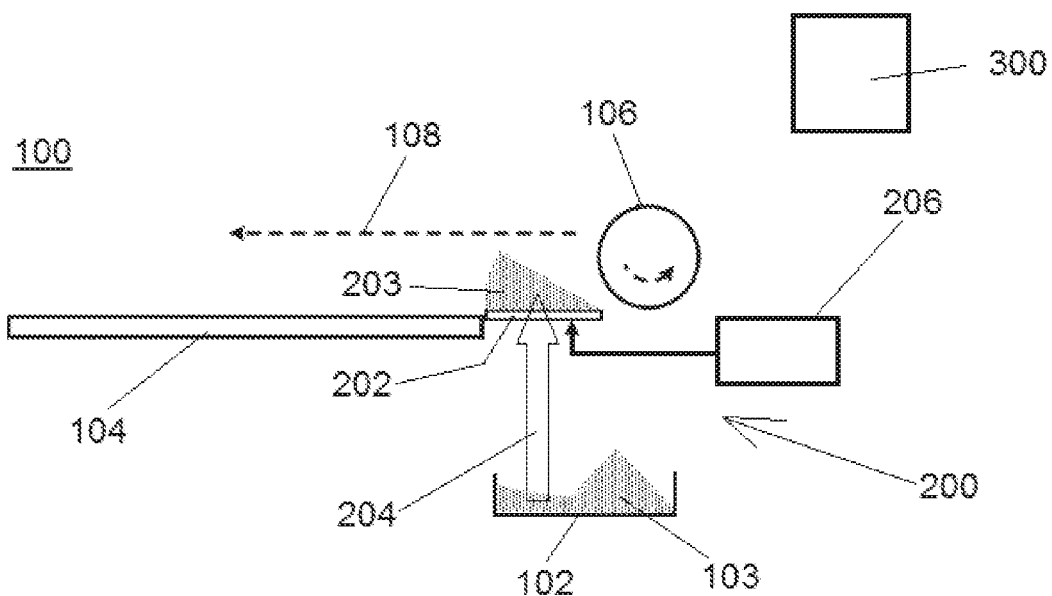
FIGURE 1
FIGURE 2
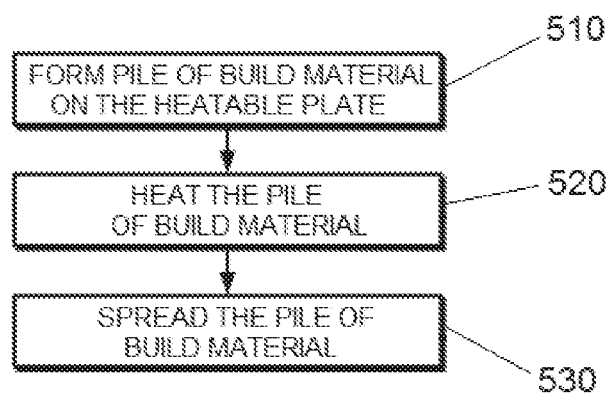

HEATING BUILD MATERIAL

BACKGROUND

Additive manufacturing techniques, such as three-dimensional (3D) printing, enable objects to be generated on a layer-by-layer basis. 3D printing techniques may generate layers of an object by forming successive layers of a build material on a build or support platform, and selectively solidifying portions of each layer of the build material.

The build material may be heated before being employed to form each layer on the support platform.

BRIEF DESCRIPTION

Examples will now be described, by way of non-limiting example only, with reference to the accompanying drawings, in which:

FIG. 1 is a simplified side view illustration of a portion of a 3D printing system, according to one example;

FIG. 2 is a flow diagram outlining an example method according to one example;

DETAILED DESCRIPTION

Figure 3:
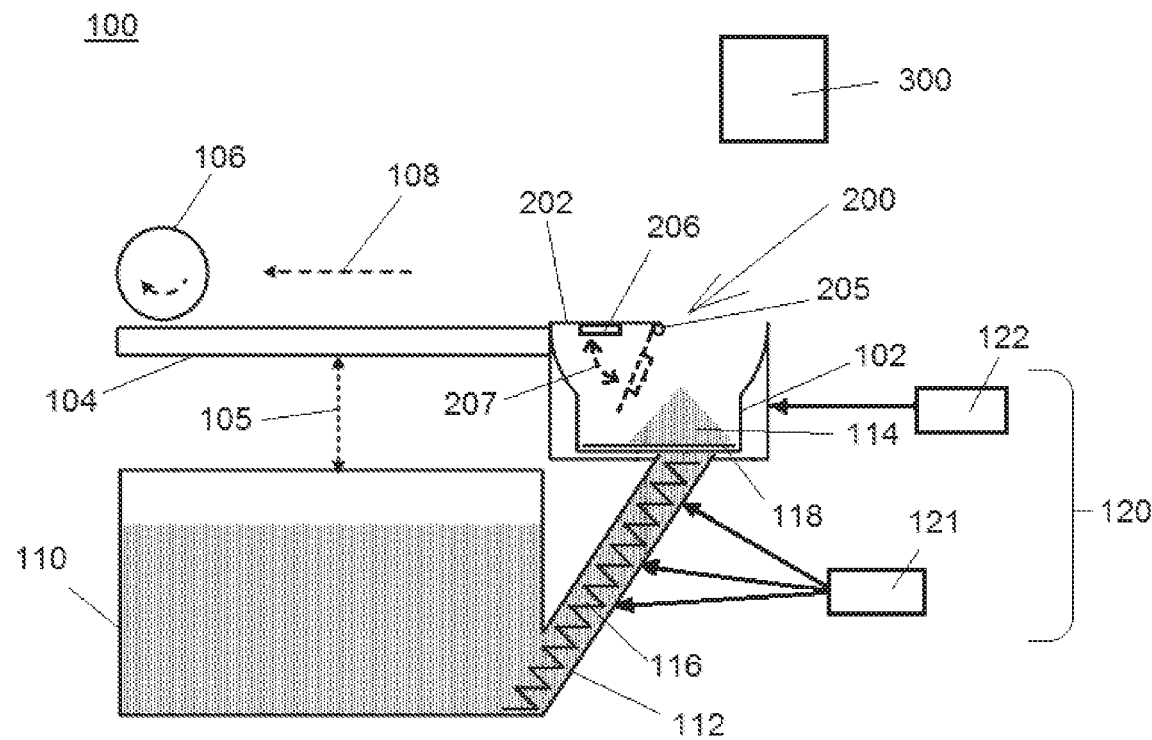
FIG. 3 is a simplified side view illustration of a portion of a 3D printing system, according to one example.

Some 3D printing systems use build material that have a powdered, or granular, form. According to one example a suitable build material may be a powdered semi-crystalline thermoplastic material. One suitable material may be Nylon 12, which is available, for example, from Sigma-Aldrich Co. LLC. Another suitable material may be PA 2200 which is available from Electro Optical Systems EOS GmbH.

In other examples other suitable build material may be used. Such materials may include, for example, powdered metal materials, powdered plastics materials, powdered composite materials, powdered ceramic materials, powdered glass materials, powdered resin material, powdered polymer materials, and the like.

During a 3D printing operation, an initial layer of build material is spread directly on the surface of a support platform, whereas subsequent layers of build material are formed on a previously formed layer of build material. Herein, reference to forming a layer of build material on the support platform may refer to, depending on the context, either forming a layer of build material directly on the surface of the support platform, or forming a layer of build material on a previously formed layer of build material.

In 3D printing systems a dose or pile of build material may be formed along a side of the support platform, to be spread over the support platform by a build material spreader. The spreader may comprise a horizontally movable roller or wiper blade, although in other examples other suitable devices may be used.

In order for selected parts of a layer of build material to be solidified as designed, the build material is relatively warm, and the temperature of the build material when it is spread on the support platform may affect the quality of the manufactured objects. Some 3D printing systems may therefore comprise heating systems for heating the build material to a temperature below the build material melting temperature before it is spread.

Heating of the build material may be done while the material is transported from a main build material store, for example placed underneath the support platform, to a build material feed tray, from which a measured amount of build material is then fed to the spreader.

Various implementations will now be described that provide an efficient and convenient system for heating the build material to be spread over the support platform, for example for use in the generation of 3D objects by a 3D printing system.

Some implementations enable an efficient operation by heating to a target temperature the amount of build material that is removed from the build material feed tray to be spread to generate one layer, so that the heating process may be faster. For example, before starting building a 3D object there may be a warm up time until the feed tray and build material reach a target temperature. During this warm up time, sacrificial layers of build material may be formed on the support platform. Some examples disclosed herein may allow reducing the warm up time, and therefore the number of sacrificial layers.

Some examples also enable reducing the temperature of the build material in the feed tray, and/or in the transport path from the main store to the feed tray, and this reduces the risk of hotspots which may give rise to defects in the manufactured object.

Referring now to FIG. 1 there is shown an illustration of a portion of a 3D printing system 100 according to some implementations, comprising a build material supply system 200 for the 3D printing system. For clarity reasons not all the elements of the 3D printing system 100 are shown. For example, the illustrations shown herein do not show any specific build material solidification systems, although any suitable build material solidification systems may be used, such as fusing agent deposition and heating systems, binder agent deposition systems, laser sintering systems, and the like.

The 3D printing system 100 may comprise a build material feed tray 102, to provide build material 103 to be spread across a support platform 104 by a build material spreader, or build material distributor, 106, which is horizontally movable along a spread direction shown by arrow 108. The spreader 106 may be mounted on a suitable carriage or gantry (not shown). In the example shown the build material spreader 106 is a roller, although in other examples other suitable forms of spreader, such as a wiper blade, may be used. Build material may be supplied to the feed tray 102 from a main build material store (not shown in FIG. 1).

The printing system 100 may comprise a build material supply system 200 for supplying build material to the spreader 108. The supply system 200 may comprise a plate 202, to support a pile of build material 203 adjacent the spreader 106. By the expression adjacent the spreader it is meant a position which is near the edge of the support platform 104 on which the build material has to be spread, or near the edge of the highest layer of build material already spread on the platform, where the spreader starts its spreading movement. In other words, a position from where the spreader, in its movement, encounters and pushes forward the build material in the pile and passes over it, whereby the material is spread to form a layer.

In some implementations, the build material supply system 200 may also comprise a feeder, schematically represented in FIG. 1 by arrow 204, to remove an amount of build material from the feed tray 102 and form the pile of build material 203 on the plate 202. In some examples, as disclosed below, the plate 202 itself may be a part of the feeder 204.

The pile of build material 203 may be spread by the spreader 106 as a layer of build material over the support platform 104, when the spreader 106 moves in the direction of arrow 108.

In some examples the supply system 200 disclosed herein may comprise a heating device 206 to heat the plate 202, such that the pile of build material 203 may be heated by the plate, i.e. by contact with the surface of the plate 202.

In some examples the heating device 206 may comprise an electrical resistor (not shown) to heat the plate 202 by Joule heating, in some examples it may comprise a magnetic induction device (not shown), and in some examples it may comprise an air heating device (not shown) to heat the interior of the plate 202. Other heating systems may also be employed to heat the plate 202.

In some implementations the plate 202 is made of a material with high thermal conductivity, which enables the plate to efficiently transmit heat to the pile of build material. The plate 202 may for example be made of metal, for example of a ferromagnetic metal, which may be heated by magnetic induction. Other examples of suitable materials may be ceramics, graphite, graphite-containing plastics, or a combination of materials.

FIG. 2 is a flow diagram outlining an example method for 3D printing according to some implementations disclosed herein, which may be performed for example in a 3D printing system such as disclosed above.

In block 510, a method for three-dimensional printing may comprise forming a pile of build material on a heatable plate, such as heatable plate 202 above, adjacent a spreading device such as spreader 106 of FIG. 1.

In block 520, the pile of build material may be caused or allowed to heat by contact with the heatable plate. The heatable plate may be heated by a heating device as disclosed above.

Once the pile of build material has reached a target temperature, or after a predetermined time has lapsed with the pile of material on the heatable plate, in block 530 the method may comprise spreading the heated pile of build material on a support platform, for example over layers of build material formed and selectively solidified in previous operations.

A target temperature for the build material depends on the material and the 3D printing system. In some examples, a target temperature may be below the melting temperature of the build material, for example between about 140° C. and about 170° C.

Referring now to FIG. 3 there is shown an illustration of a portion of a 3D printing system 100 according to some implementations, with some elements in common with the example of FIG. 1. In FIG. 3, a main build material store 110 comprising build material may be placed for example under the support platform 104, and a feed channel 112 may be provided to move build material from the store 402 to a delivery zone 114 of the feed tray 102. The feed channel 112 may comprise a feed mechanism, such as an auger screw 116, or any other suitable feed mechanism.

In some examples, the feed tray 102 may comprise a build material distribution element 118, such as for example a movable mesh-like structure that is mounted at the bottom of the tray 102 and may be controlled to reciprocate, or slide, along the base of the feed tray 102 by a small amount, for example in the direction perpendicular to the plane of the drawing in FIG. 3, to help distribute build material within the feed tray 102.

FIG. 3 also shows that the support platform 104 may be movable in the z-axis, as indicated by arrow 105, to enable it to be lowered as each layer of build material formed thereon is processed by the 3D printing system 100.

In examples such as shown in FIG. 3 the build material supply system 200 comprises the heatable plate 202 with an associated heating device 206.

In some examples, the plate 202 may be a part of the feeder (which is generally indicated in FIG. 1 by arrow 204): for example, the plate 202 may be movable between a position in which it is at least partially inside the build material feed tray 102, to remove an amount of build material from the feed tray 102, and the substantially horizontal delivery position, shown in solid line in FIG. 3, in which the pile of build material is placed adjacent the spreader 106.

In some examples, such as shown in FIG. 3, the plate 202 may be rotatable, for example, as shown by arrow 207, about a horizontal axis 205 that is perpendicular to the spreading direction 108, to remove or collect build material from the feed tray 102. An intermediate position in which the plate 202 is at least partially inside the build material feed tray 102 is shown in dotted lines in FIG. 3. The plate 202 may be driven by any suitable drive mechanism (not shown), such as a stepper motor, rack and pinion arrangement, or the like and may additionally be coupled to a position determination module (not shown), such as an angular encoder, to enable the angular position of the plate to be accurately controlled and determined.

In other implementations the plate 202 may also be fixed in the delivery position and fed with build material by a separate feeder, such as indicated by arrow 204 in FIG. 1.

In some implementations, in the delivery position the upper surface of the plate 202 is substantially level with a lower spreading plane of the spreader: for example, in this case it is substantially level with the lower edge of the roller of spreader 106, such that the spreader travels slightly above the upper surface of the plate 202 and sweeps or drags substantially all the pile of build material present on the plate.

In some implementations a build material supply system for a three-dimensional printing system may also comprise a pre-heating device to pre-heat the build material before it is removed from the feed tray 202.

According to some examples, and as shown in FIG. 3, a pre-heating device 120 may comprise heaters 121 along the feed channel 112, to pre-heat the build material while it is transported, or heaters 122 associated with the feed tray 102, or both. In such cases, the pre-heating device 120 may heat the build material up to an intermediate temperature, lower than a target temperature, during its transport along the build material supply path between the build material store 110 and the feed tray 102. Then, before each layer is spread by the spreader 106, a relatively small amount of build material, which forms the pile a build material to be spread, may be heated to the target temperature by its contact with the heatable plate 202.

An intermediate temperature at which it may be suitable to pre-heat the build material depends on the target temperature, on the material and on the build material supply system. In some examples, for a target temperature between about 140° C. and about 170° C., a suitable intermediate temperature may be between about 110° C. and about 130° C.

Figure 4:
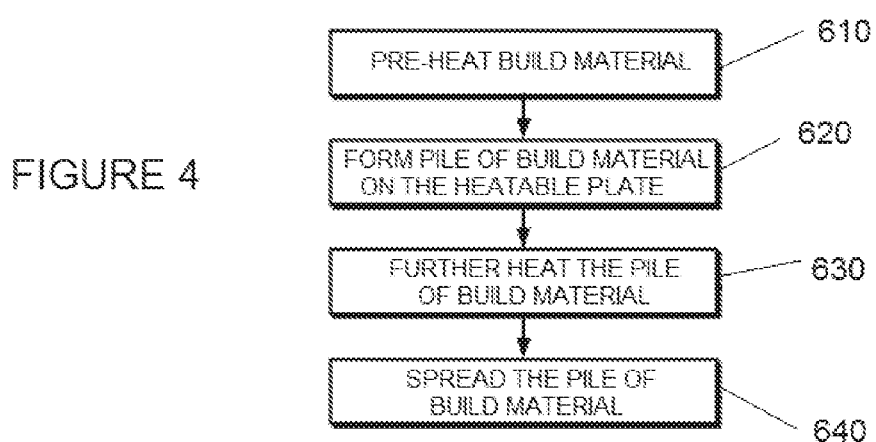
FIGS. 4 and 5 are flow diagrams outlining example methods according to examples disclosed herein.

FIG. 4 is a flow diagram outlining an example method for 3D printing according to some implementations disclosed herein, which may be performed for example in a 3D printing system such as disclosed in FIG. 3.

In block 610, the method may comprise pre-heating build material. For example, in a printing system as shown in FIG. 3, the build material may be heated during its transport from the main build material store 110 along the feed channel 112 and into the feed tray 102.

In block 620, a pile of pre-heated build material may be formed on the heatable plate 202, and in block 630 the pile of build material may be further heated by contact with the plate 202, to reach a target temperature. The heatable plate may be heated by a heating device as disclosed above.

In block 640 the heated pile of build material may be spread on the previous layer of build material on the support platform.

Figure 5:
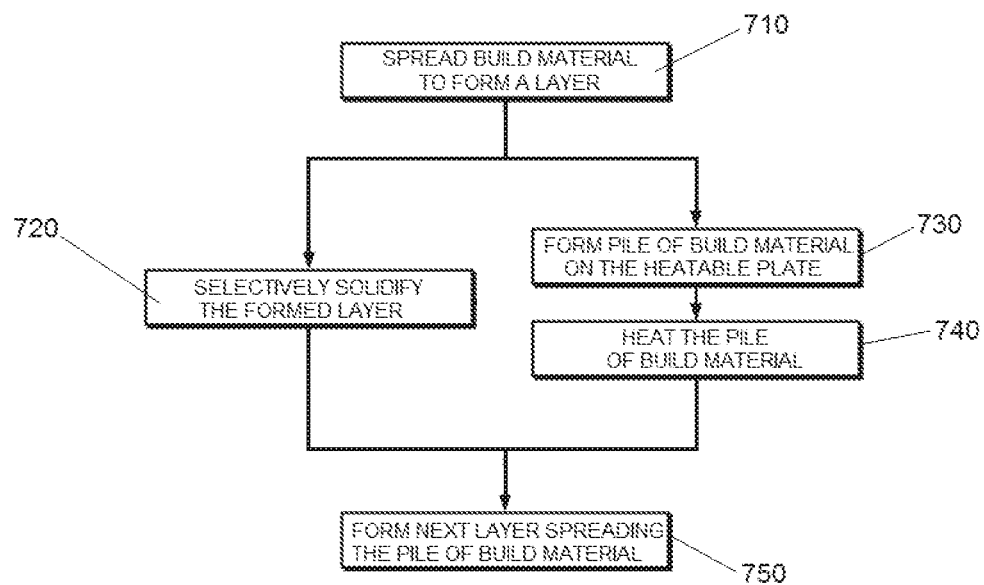

FIG. 5 is a flow diagram outlining an example method for 3D printing according to some implementations disclosed herein, which may be performed for example in a 3D printing system such as disclosed in FIG. 1, or such as disclosed in FIG. 3.

In some implementations, the method involves heating the pile of build material in contact with the heatable plate while a layer of build material that was previously spread on the support platform is caused to selectively solidify.

For example, in block 710 the method may comprise spreading build material to form a layer, directly on the surface of the support platform, or on a previously formed layer of build material.

In block 720, the formed layer may be caused to selectively solidify, employing any suitable build material solidification systems, such as fusing agent deposition and heating systems, binder agent deposition systems, laser sintering systems, and the like.

While the layer formed in block 710 is selectively solidified in block 720, in blocks 730 and 740 a new pile of build material may be formed on the heatable plate 202, and heated by contact with the plate. The heatable plate may be heated by a heating device as disclosed above.

Once the previous layer is suitably solidified as provided in block 720, and the new pile of build material on the plate 202 is heated as provided in block 740, the next layer of build material is formed, by spreading the pile of build material on the previous layer.

Figure 6:
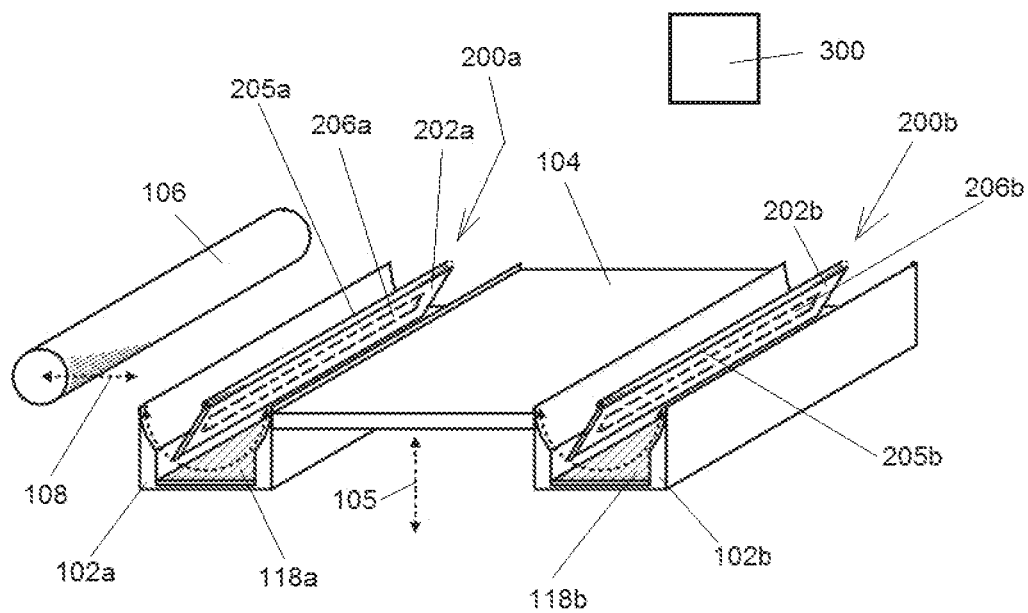
FIG. 6 is a simplified isometric illustration of a portion of a 3D printing system, according to one example.

FIG. 6 is a simplified isometric illustration of a portion of another 3D printing system, according to examples disclosed herein.

In implementations as illustrated in FIG. 6, a pair of feed trays 102a and 102b may be provided on opposite sides of the support platform 104 in a spreading direction 108, and each may be provided with a corresponding distribution element 118a, 118b. In some examples the trays 102a, 102b may be supplied with build material from a main build material store (not shown) through corresponding feed channels (not shown), as disclosed for other implementations.

A pile of build material may be supplied from each tray, and therefore piles of build materials may be formed at opposite ends of the support platform 104, on respective plates 202a and 202b. Two corresponding heating devices 206a and 206b may be provided to heat the plates 202a and 202b.

According to some implementations, the plates 202a and 202b may be movable, for example rotatable about corresponding axes 205a, 205b, or in any other way. However, other implementations of the 3D printing system and of the build material supply systems 200a, 200b are possible, as disclosed in the case of FIGS. 1 and 3.

Implementations of a 3D printing system such as shown in FIG. 6 may be operated in a bi-directional manner. By bi-directional is meant that layers of build material may be formed on the support platform 104 by the build material spreader 108 using build material from either of the build material supply systems 200a and 200b. Such a 3D printing system may also be able to selectively solidify portions of a formed layer of build material whilst operating in either direction, and whilst the piles of build material on plates 202a, 202b are being heated.

In one example the support platform 104 may be part of a removable build module that may be insertable into the 3D printing system. Accordingly, reference herein to a support platform will be understood to generally refer to when such a build module is inserted into the 3D printing system.

Figure 7:
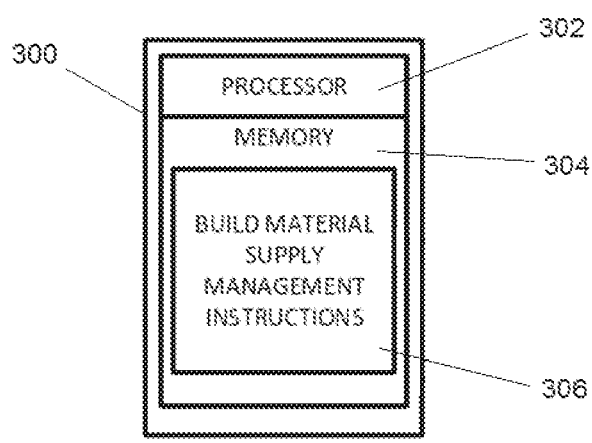
FIG. 7 is a block diagram of a controller.

Three-dimensional printing systems as discloses herein may comprise a controller 300, shown in greater detail in FIG. 7. The controller 300 may comprise a processor 302 coupled to a memory 304. The memory 304 stores build material supply management instructions 306 that, when executed by the processor 302, control the operation of the 3D printing system and the build material supply system as disclosed in the above examples.

For example, controller 300 (see FIGS. 1, 2 and 6) may control the heating devices 206, 206a, 206b to heat the plate and the pile of build material supported on the plate, and may control the feeder 204 (FIG. 1) and/or the movement of the plates 202, 202a, 202b (FIGS. 1, 3, 6) to remove build material from the feed trays 102, 102a, 102b.

It will be appreciated that examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A build material supply system for a three-dimensional printing system, comprising:

a plate to support a pile of build material adjacent a spreader, a feeder to remove build material from a feed tray and form the pile of build material on the plate to be spread by the spreader, and a heating device to heat the plate and heat the pile of build material on the plate by contact with the plate, and a pre-heating device to pre-heat the build material before it is removed by the feeder from the feed tray and on to the plate, wherein:

the pre-heating device is connected to the feed tray to heat the build material while it is in the feed tray before the build material is removed by the feeder; and/or the system includes a feed channel through which build material is moved from a build material store directly to the feed tray and the pre-heating device comprises a heater along the feed channel to heat the build material while the build material is transported through the channel to the feed tray.

2. A build material supply system as claimed in claim 1, wherein the heating device comprises at least one of an electrical resistor, a magnetic induction device or an air heating device.

3. A build material supply system as claimed in claim 1, wherein the plate is made of material with high thermal conductivity.

4. A build material supply system as claimed in claim 1, wherein the pre-heating device is connected to the feed tray to heat the build material while in the feed tray before the build material is removed by the feeder.

5. A build material supply system as claimed in claim 1, further comprising a feed channel through which build material is moved from a build material store directly to the feed tray and wherein the pre-heating device comprises a heater along the feed channel to heat the build material while the build material is transported through the channel to the feed tray.

6. A build material supply system as claimed in claim 1, wherein the plate is part of the feeder and movable to remove build material from the feed tray, and to adopt a substantially horizontal delivery position in which the pile of build material is placed adjacent the spreader.

7. A build material supply system as claimed in claim 6, wherein in the delivery position upper surface of the plate is substantially level with a lower spreading plane of the spreader.

8. A build material supply system as claimed in claim 6, wherein the plate is rotatable about a horizontal axis that is perpendicular to a spreading direction.

\* \* \* \* \*